(12) United States Patent
Giacobbe et al.

(10) Patent No.: US 6,574,972 B2
(45) Date of Patent: *Jun. 10, 2003

(54) LOW TEMPERATURE HEAT TRANSFER METHODS

(75) Inventors: Frederick W. Giacobbe, Naperville, IL (US); Michael G. Pizzo, Yorkville, IL (US)

(73) Assignees: L'Air Liquide - Societe' Anonyme a' Directoire et Conseil de Surveillance pour l'Etude et l'Exploitation des Procedes Georges Claude, Paris (FR); American Air Liquide, Fremont, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/999,880

(22) Filed: Oct. 31, 2001

(65) Prior Publication Data

US 2002/0157403 A1 Oct. 31, 2002

Related U.S. Application Data

(60) Provisional application No. 60/287,491, filed on Apr. 30, 2001.

(51) Int. Cl.⁷ ............................................. F25D 17/06
(52) U.S. Cl. ..................... 62/96; 62/51.1; 62/434; 62/616
(58) Field of Search .................... 62/51.1, 434, 616, 62/96

(56) References Cited

U.S. PATENT DOCUMENTS 3,363,207 A * 1/1968 Brechna ..................... 62/51.1
3,552,135 A * 1/1971 Peavler ...................... 62/51.1
4,032,337 A * 6/1977 Boyer ........................ 62/51.1

(List continued on next page.)

FOREIGN PATENT DOCUMENTS

| EP | 0 079 186 A1 | 5/1983 |
| EP | 0 321 182 A2 | 6/1989 |
| JP | 246837 | 10/1987 |
| SU | 1723059 A1 | 3/1992 |
| WO | WO 83 02268 A1 | 7/1983 |

OTHER PUBLICATIONS

Vanco, Michael R., "Analytical Comparison of Relative Heat-Transfer Coefficients and Pressure Drops of Inert Gases and Their Binary Mixtures," National Aeronautics and Space Administration, TN D2677, Feb. 1965, pp. 1–15, Washington, D.C.

Giacobbe, F.W., "Heat Transfer Capability of Selected Binary Gaseous Mixtures Relative to Helium and Hydrogen," Applied Thermal Engineering, 1998, pp. 199–206, vol. 18, Nos. 3–4.

Holoboff, R., et al., "Gas Quenching With Helium," Advanced Materials & Processes, Feb. 1993, pp. 23–26, vol. 143, No. 2.

(List continued on next page.)

Primary Examiner—Ronald Capossela
(74) Attorney, Agent, or Firm—Linda K. Russell; Christopher J. Cronin

(57) ABSTRACT

Methods of cooling an object are presented, the methods comprising contacting a heat transfer fluid with a liquid cryogen to form a precooled, substantially pure heat transfer fluid, and contacting the object with the precooled substantially pure heat transfer fluid to form a cooled object and a recycle flow of the heat transfer fluid. The heat transfer fluid consists essentially of a compound selected from the group consisting of substantially pure hydrogen, substantially pure helium, substantially pure argon, substantially pure nitrogen, and substantially pure carbon dioxide. Each of the contacting steps may be either direct contact, indirect contact, or combinations thereof.

33 Claims, 4 Drawing Sheets

U.S. PATENT DOCUMENTS

| | | | |
|---|---|---|---|
| 4,126,436 A | | 11/1978 | Bailey |
| 4,154,592 A | | 5/1979 | Bailey |
| 4,166,799 A | | 9/1979 | Giacobbe |
| 4,208,200 A | | 6/1980 | Claypoole et al. |
| 4,237,700 A | * | 12/1980 | Rothchild .................. 62/51.1 |
| 4,400,190 A | | 8/1983 | Briere |
| 4,437,870 A | | 3/1984 | Miller |
| 4,514,205 A | | 4/1985 | Darcangelo et al. |
| 4,531,959 A | | 7/1985 | Kar et al. |
| 4,594,088 A | | 6/1986 | Paek et al. |
| 4,627,244 A | | 12/1986 | Willhoft |
| 4,664,689 A | | 5/1987 | Davis |
| 4,673,427 A | | 6/1987 | Van Der Giessen et al. |
| 4,761,168 A | | 8/1988 | Blyler, Jr. et al. |
| 4,838,918 A | | 6/1989 | Vaughan et al. |
| 4,913,715 A | | 4/1990 | Jochem et al. |
| 4,966,615 A | | 10/1990 | Linden et al. |
| 4,988,374 A | | 1/1991 | Harding et al. |
| 4,995,892 A | | 2/1991 | Garrett et al. |
| 5,059,229 A | | 10/1991 | Blankenship |
| 5,160,359 A | | 11/1992 | Strackenbrock et al. |
| 5,284,499 A | | 2/1994 | Harvey et al. |
| 5,377,491 A | | 1/1995 | Schulte |
| 5,568,728 A | | 10/1996 | Sapsford |
| 5,606,861 A | | 3/1997 | Renz |
| 5,897,682 A | | 4/1999 | Koaizawa et al. |
| 5,921,091 A | | 7/1999 | Foss et al. |
| 6,092,391 A | | 7/2000 | Chludzinski |
| 6,125,638 A | | 10/2000 | Ji et al. |
| 6,253,575 B1 | | 7/2001 | Chludzinski |
| 6,254,666 B1 | | 7/2001 | Li et al. |

OTHER PUBLICATIONS

Bird, R.B., et al., Transport Phenomena, 1960, pp. 392–393.

McEligot, D.M., et al., "Internal Forced Convection to Mixtures of Inert Gases", Int. J. Heat Mass Transfer, Pergamon Press 1977, pp. 475–486, vol. 20, Great Britain.

Bammert, K., et al., "The Influence of He–Ne, He–N2, nd He–CO2, Gas Mixtures and Closed–Cycle Gas Turbines," ASME Reference Paper, 74–GT–124, 1974, pp. 1–8.

Hawley's Condensed Chemical Dictionary, Twelfth Edition, 1993, p. 525.

Montierth, M.R., "Optical Fiber Drawing Techniques," Optical Spectra, Oct. 1978, pp. 42–48.

National Refrigerants, "Technical Updates: Alternative Refrigerant Terminology", http://www.refrigerants.com/1tterm.htm, Aug. 2, 2001, pp. 1–3.

Lavelle, James, Technical Updates: "Understanding Fractionation of Refrigerant Blend," National Refrigerants, http://www.refrigerants.com/undfract.htm, Aug. 2, 2001, pp. 1–4.

Rajala, Markku, et al., "Combination Furnace for Drawing Large Optical Fibre Preforms at High Speed," Internatioal Wire and Cable Symposium Proceedings, 1998, pp. 483–488.

Giacobbe, F.W., "Estimation of Prandtl Numbers in Binary Mixtures of Helium and Other Noble Gases," J. Acoust. Soc. Am. 96, Dec. 1994, pp. 3568–3580.

Kirk–Othmer, "Fuel Resources to Heat Stabilizers," Encyclopedia of Chemical Technology, 1994, pp. 614–617, $4^{th}$ Ed., vol. 12.

Hall, W. James, "Concentrating on Reflow's Cooling Zones", www.epp.com, Mar. 2001, pp. 44–51.

Kirov, V.S., et al., "Determination of Heat–Transfer Coefficient for Gas Mixtures Containing Helium and Hydrogen," Odessa Polytechnic Institute, Translated from Inzhenerno–Fizicheskii Zhurnal, Feb. 1974, pp. 152–154, vol. 26, No. 2.

* cited by examiner

LOW TEMPERATURE HEAT TRANSFER METHODS

CROSS-REFERENCE TO RELATED APPLICATIONS

This application claims priority from provisional patent application serial number 60/287,491, filed Apr. 30, 2001, incorporated by reference herein.

BACKGROUND OF THE INVENTION

1. Field of the Invention

This invention relates to novel low temperature heat transfer methods in a variety of applications.

2. Related Art

Pure or relatively pure helium has excellent heat transfer properties. For example, helium is typically employed to enhance fiber cooling during the optical fiber drawing process because it is chemically inert and because of its heat transfer properties. Of the common pure gases, only hydrogen has a higher thermal conductivity than pure helium. However, hydrogen is not as inert as helium and it is more hazardous to employ in certain heat transfer applications than any inert gas. So, hydrogen is typically avoided as a gaseous heat transfer medium in some (but not all) cooling or heating process applications. Substantially pure argon, nitrogen, or carbon dioxide are also typically avoided as gaseous cooling agents because their heat transfer properties are not as good as either hydrogen or helium, but they are safer to use than hydrogen and much cheaper than helium.

Typical impurities in the helium used in heat transfer processes are due to minor impurities initially present within the source of "pure" helium as well as contamination by infiltration of other species into the helium that is used to transfer heat between the helium and the item or material being cooled or heated. These impurities often consist primarily of nitrogen and oxygen with much smaller concentrations of argon, carbon dioxide, and water vapor as well as even smaller concentrations of other gaseous constituents normally found in air. These impurities are generally tolerated because they are difficult and/or costly to avoid.

It is generally accepted that binary mixtures of helium (or hydrogen) with other gases will have better heat transfer coefficients than the pure gases themselves. See, for example, M. R. Vanco, "Analytical Comparison of Relative Heat-Transfer Coefficients and Pressure Drops of Inert Gases and Their Binary Mixtures, NASA TN D2677 (1965); F. W. Giacobbe, "Heat Transfer Capability of Selected Binary Gaseous Mixtures Relative to Helium and Hydrogen", Applied Thermal Engineering Vol. 18, Nos. 3–4, pp.199–206 (1998); R. Holoboff at al., "Gas Quenching With Helium", Advanced Materials & Processes, Vol. 143, No. 2, pp.23–26 (1993). In particular, Holoboff et al. noted that in the context of a heat treating furnace, by changing to an optimum helium/argon mixture, a customer was able to heat treat parts that could not be processed as rapidly when using argon alone, while maintaining costs at a fraction of that for using 100% helium. In a separate example the same authors also recognized the benefits of increasing the fan speed (gas circulation velocity) on cooling rate for pure helium and for pure nitrogen. However, there is no teaching or suggestion of the influence of heat transfer fluid mixture velocity on cooling rate for optimized mixtures of heat transfer fluid.

For illustrative purposes, and according to earlier theories, the relative heat transfer capability of helium plus one other noble gas compared to pure helium may be seen in FIG. 1. In FIG. 1, pure helium has been arbitrarily assigned a relative heat transfer capability of 1.0 in order to deliberately avoid the use of a more complicated system of SI heat transfer units. Therefore, if a binary gas mixture containing helium has a heat transfer capability of 2.0 (relative to pure helium), it is assumed from this data that the gas mixture will be 2.0 times more effective in any heat transfer process employing that gaseous mixture instead of pure helium alone. And, as a simplified illustration of the potential helium savings using this data, if the best binary gas mixture contained only 50 percent (by volume or mole fraction) helium plus 50 percent of some other gas, only ½ of that gas mixture would be needed to perform the same cooling function as the pure helium alone. Therefore, only 25 percent of the helium that would have been required for a particular heat exchange process using pure helium would be needed during the same cooling process employing the gas mixture.

In FIG. 2, and also according to earlier theories, the optimum composition and approximate relative heat transfer capability of hydrogen plus one noble gas with respect to pure helium is illustrated. In FIG. 2, pure helium has also been arbitrarily assigned a relative heat transfer capability of 1.0. So, if a binary gas mixture containing only hydrogen and argon (but no helium) has a heat transfer capability of 1.4 (relative to pure helium), that gas mixture presumably will be 1.4 times more effective in any heat transfer process employing that gaseous mixture instead of pure helium alone. And, since no helium is required to produce this effect, the helium usage is cut to zero. Furthermore, since hydrogen and argon are typically much less expensive than helium, the overall cost of the hydrogen/argon coolant gas stream will tend to be negligible compared to a pure (or relatively pure) helium coolant gas steam.

It should be emphasized that the data presented in FIGS. 1 and 2 are theoretical and based on turbulent flow for all the gases and gas mixtures considered. However, in the seminal work of R. B. Bird, W. E. Stewart, and E. N. Lightfoot, Transport Phenomena, pp. 392–393 (1960) it was pointed out that "the heat-transfer coefficient depends in a complicated way on many variables, including the fluid properties (k, $\mu$, $\rho$, $C_p$), the system geometry, the flow velocity, the value of the characteristic temperature difference, and the surface temperature distribution." In engineering design, therefore, use of constant property idealization frequently leads to either a greater built in safety factor, or a dangerous situation if the other extreme is taken. See D. M. McEligot, et al., "Internal Forced Convection to Mixtures of Inert Gases", Int. J. Heat Mass Transfer, Vol. 20, pp. 475–486 (1977).

Everyone agrees that helium is an expensive fluid. While it is inert, it is a non-renewable resource. Once it escapes to the atmosphere it is not recoverable. Helium is commonly recycled, sometimes after purification, such as described in U.S. Pat. Nos. 5,897,682 and 6,092,391. However this requires expensive compression and/or cryogenic equipment. Indeed, as noted by K. Bammert et al., "The Influence of He—Ne, He—$N_2$, and He—$CO_2$ Gas Mixtures on Closed-Cycle Gas Turbines", ASME paper 74-GT-124 (1974), while pure helium is often considered the best gaseous fluid in terms of heat transfer efficiency (except for pure hydrogen) and therefore heat exchange units may be particularly compact, the size of compression equipment required to compress the gas is prohibitive in many applications, such as space travel. Thus, the expense of the heat transfer fluid (helium) is combined with a relatively large expense for compression equipment, even though heat transfer equipment may be smaller.

In light of the unexpected nature of heat transfer coefficients of gases and gas mixtures, it would be advantageous in many heat transfer situations common in engineering to employ a substantially pure heat transfer fluid, even though the substantially pure fluid heat transfer coefficient is less than the heat transfer coefficient of a mixture of that fluid with another heat transfer fluid under certain conditions.

SUMMARY OF THE INVENTION

In accordance with the present invention, a first aspect of the invention is a method of cooling an object, the method comprising: a) contacting a heat transfer fluid with a liquid cryogen to form a precooled heat transfer fluid; and b) contacting the object with the precooled heat transfer fluid to form a cooled object and a recycle flow of said heat transfer fluid, the precooled heat transfer fluid consisting essentially of a compound selected from the group consisting of substantially pure hydrogen, substantially pure helium, substantially pure argon, substantially pure nitrogen, and substantially pure carbon dioxide, and wherein the contacting the object is selected from the group consisting of directly contacting the object, indirectly contacting the object, and combinations thereof.

Preferred are methods wherein the precooled heat transfer fluid has a concentration of at least about 90 mole percent, more preferably at least about 95 mole percent, more preferably at least about 99 mole percent.

Preferred are methods wherein a temperature of the cooled object, and a temperature of the precooled heat transfer fluid are monitored. Particularly preferred are methods wherein these temperatures are used to control flow of the precooled heat transfer fluid, flow of the cryogen, and the recycle flow of heat transfer fluid.

Other preferred methods are those wherein the object is substantially stationary and the precooled heat transfer fluid moves past the object.

Yet other preferred methods are those wherein the object moves continuously through a space and the precooled heat transfer fluid moves through the space during the step of contacting the object with the precooled heat transfer fluid.

Preferred methods also include methods wherein the precooled heat transfer fluid exchanges heat with a second heat transfer fluid, and the second heat transfer fluid directly contacts the object.

Preferably, the object is a substantially cylindrical object traversing through a substantially confined space, more preferably an optical fiber traversing through a heat exchanger.

More preferably, the methods comprise spraying the precooled heat transfer fluid onto the object.

A second aspect of the invention is a method of cooling a substantially cylindrical object traversing a substantially confined space, the method comprising: a) directly contacting a heat transfer fluid with the substantially cylindrical object inside of the confined space, the confined space defined by a substantially cylindrical tube having a tube inlet and a tube outlet, the substantially cylindrical object entering the tube inlet and exiting the tube outlet, the substantially cylindrical tube having a heat transfer fluid inlet near the tube outlet and a heat transfer fluid outlet near the tube inlet; and b) substantially maintaining a temperature of the heat transfer fluid contacting the substantially cylindrical object at a precooled temperature by indirectly or directly contacting the heat transfer fluid with a cryogen to form a cooled substantially cylindrical object and an exit flow of the heat transfer fluid, the heat transfer fluid consisting essentially of a compound selected from the group consisting of substantially pure hydrogen, substantially pure helium, substantially pure argon, substantially pure nitrogen, and substantially pure carbon dioxide.

Preferred methods within this aspect of the invention are those wherein step b) comprises monitoring the temperature of the heat transfer fluid and a temperature the exit flow of the heat transfer fluid; methods wherein step b) comprises monitoring a flow of the cryogen; methods wherein a temperature of the cooled substantially cylindrical object is monitored; methods wherein a diameter of the cooled substantially cylindrical object is monitored; methods wherein a flow of the cryogen and a flow of the heat transfer fluid are controlled, and combinations of these.

As used herein the terms "precooled" and "precooled temperature" mean the heat transfer fluid is cooled significantly below ambient temperature (typically 25° C.), preferably more than 20° C. below ambient, more preferably more than 50° C. below ambient, and most preferably at least 100° C. below ambient temperature. As used herein the term "substantially pure" means that the heat transfer fluid does not contain an amount of another gas or liquid that would significantly change the heat transfer characteristics of the selected gas. As used herein, the term "heat transfer fluid" means a gas, or mixture consisting of a gas and a liquid, or a liquid.

Surprisingly, precooled versions of substantially pure gas, such as hydrogen, have as good or better heat transfer characteristics than mixtures of hydrogen and another gas, say helium, at bulk velocities where one of skill in the art would have expected (without knowledge of the present invention) that the mixtures would have better heat transfer characteristics. This can have enormous consequences in situations where one gas of the gas mixture is not readily available, or available but too expensive to obtain or store, or where mixing and mixture monitoring equipment is unavailable, or potentially unreliable. The teachings of the invention allow heat transfer designers another option, use of precooled, substantially pure heat transfer fluids, rather than heat transfer mixtures. While there is a cost in precooling the heat transfer fluids to the precooled temperature, the simplicity of using a single heat transfer fluid, rather than mixing, may be attractive to some heat transfer designers.

Further aspects and advantages of the methods of the invention will become apparent after reading the following description and claims.

BRIEF DESCRIPTION OF THE DRAWING FIGURES

DESCRIPTION OF PREFERRED EMBODIMENTS

Studies performed in our laboratories determined that the heat transfer coefficients for gases containing a relatively high concentration of at least one "light gas" plus at least one "heavy gas" are higher than the heat transfer coefficient of the individual gas stream only at a specific range of bulk velocity, referred to herein as the "critical bulk velocity range." Above or below this range of critical bulk velocity range, the light gas stream will have a higher heat transfer coefficient than the mixtures.

One problem, however, is that the designer of a particular heat transfer system may not have at his or her disposal a heat transfer gas mixture, but would like to have the same or better heat transfer for a given application. This is the problem addressed in the present invention.

In accordance with the present invention, and as mentioned previously, the inventor herein has discovered that precooled, substantially pure gases may be employed as heat transfer fluids that have substantially the same heat transfer capability (cooling ability) as mixtures of those gases with other light or pure heavy fluids. In particular, by simply measuring the bulk velocity of the precooled, substantially pure heat transfer fluid, a characteristic temperature difference of the system (either the heat transfer fluid or the item being cooled) and the cooling demand, excellent cooling may be realized by the operator of the process or equipment utilizing the inventive methods.

Figure 3:
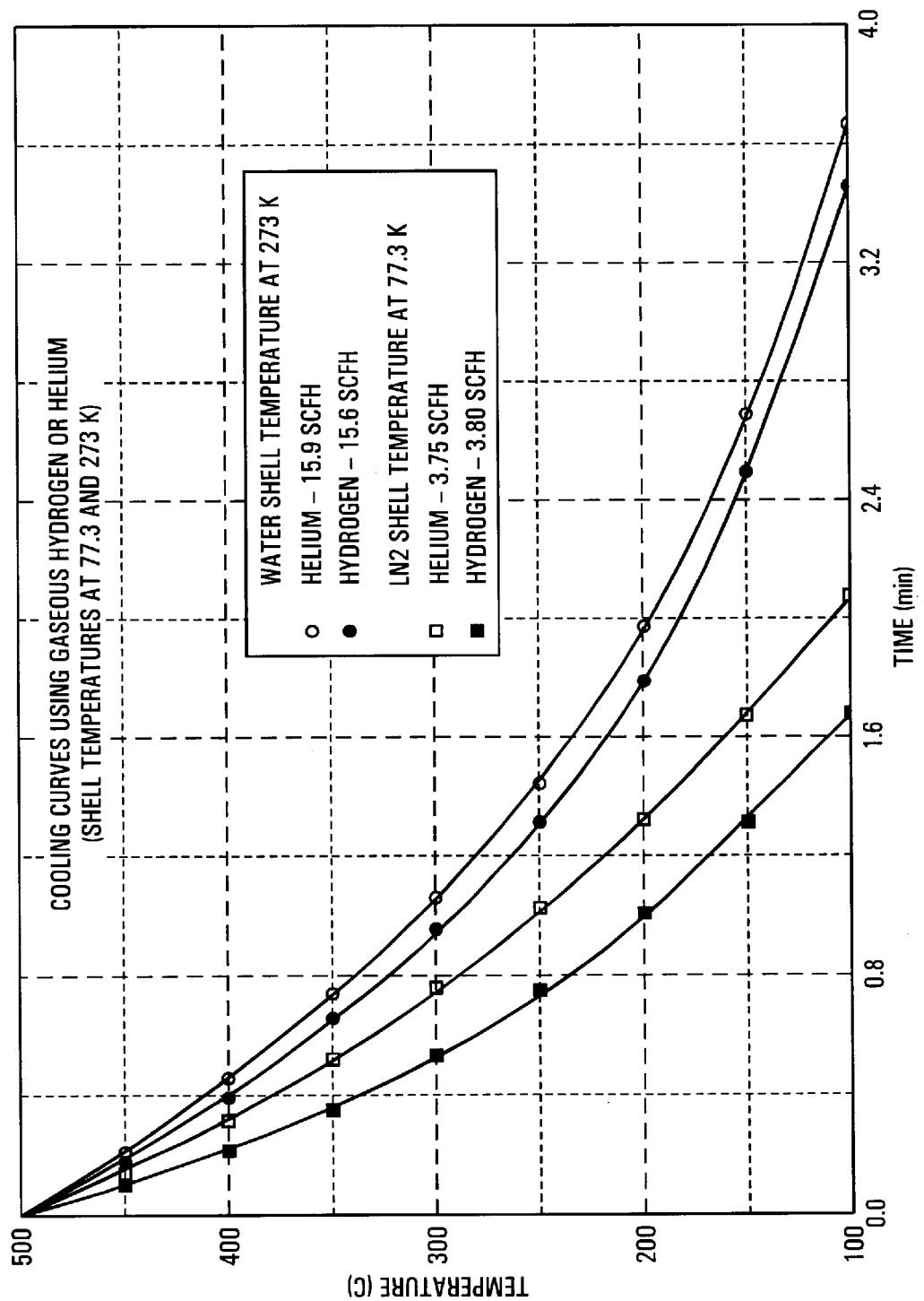
FIG. 3 illustrates graphically experimental data obtained using an apparatus similar to that of FIG. 5 for substantially pure helium and substantially pure hydrogen, at two initial temperatures of 273 K and 77.3 K, used to cool a stainless steel heating element initially at 873 K using direct heat exchange.

The inventive discovery may be seen by reviewing the data illustrated graphically in FIG. 3. This data was generated using a laboratory apparatus similar to the apparatus illustrated in FIG. 5, discussed herein below. The laboratory apparatus comprised a stainless steel cylindrical heating element, approximately 0.5 inch (1.3 cm) outside diameter, and 16 inches (41 cm) long, which was placed vertically internal of a cavity formed by an internal surface of a cylindrical shell, also positioned vertically. The internal diameter of the cylindrical shell was about 2.0 inches (5.0 cm). The cylindrical shell itself had an annular internal space adapted to allow coolant to flow there through, such as ice-cold water (273 K) or liquid nitrogen (77.3 K). In running the experiments, the cylindrical heating element was heated to about 600° C. (873 K), then cooled with flowing gas, either substantially pure helium or substantially pure hydrogen. In one set of data, the gases were cooled using ice water first then flowed into the cavity, with the shell cooled using ice water (about 273 K). In the other set of data, the gases were cooled using liquid nitrogen, then flowed into the cavity, with the shell maintained at liquid nitrogen temperature (77.3 K). Time for the temperature of the cylindrical heating element to drop from 500° C. (773 K) to 100° C. (373 K) was measured. As may be seen by the data in FIG. 3, flow rates of hydrogen and helium were much less when the gases were cooled to liquid nitrogen temperature, but even when cooled to ice water temperature, the gases cooled the heating substantially faster than the gases would have at room temperature (about 298 K).

Figure 2:
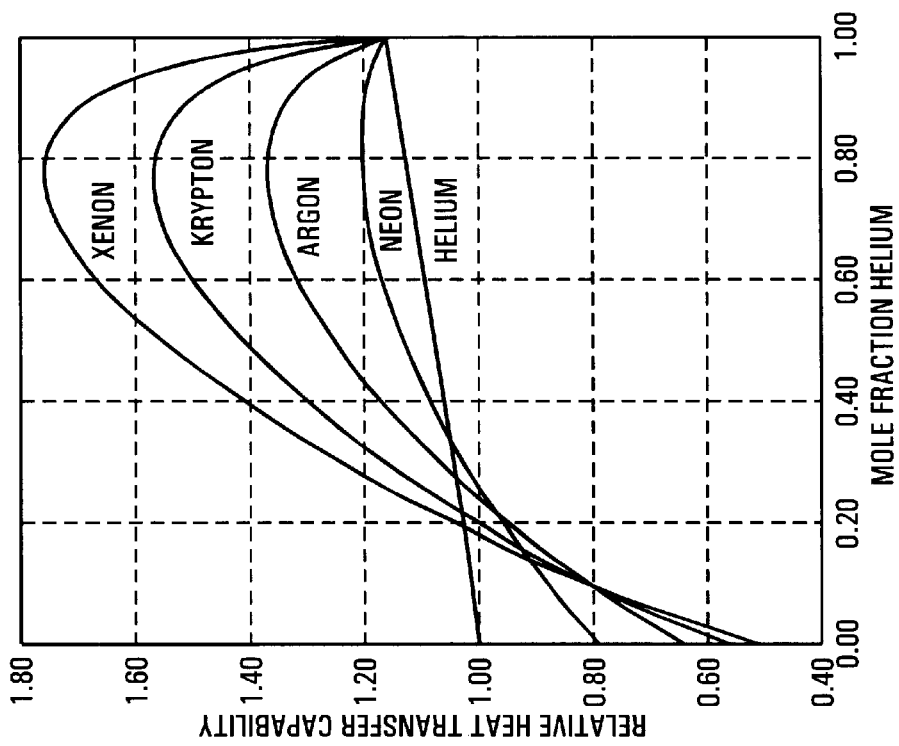
FIGS. 1 and 2 illustrate the conventional belief that mixtures of helium with another noble gas, and mixtures of hydrogen with a noble gas, are always more effective heat transfer fluids than either substantially pure helium or substantially pure hydrogen.
Figure 1:
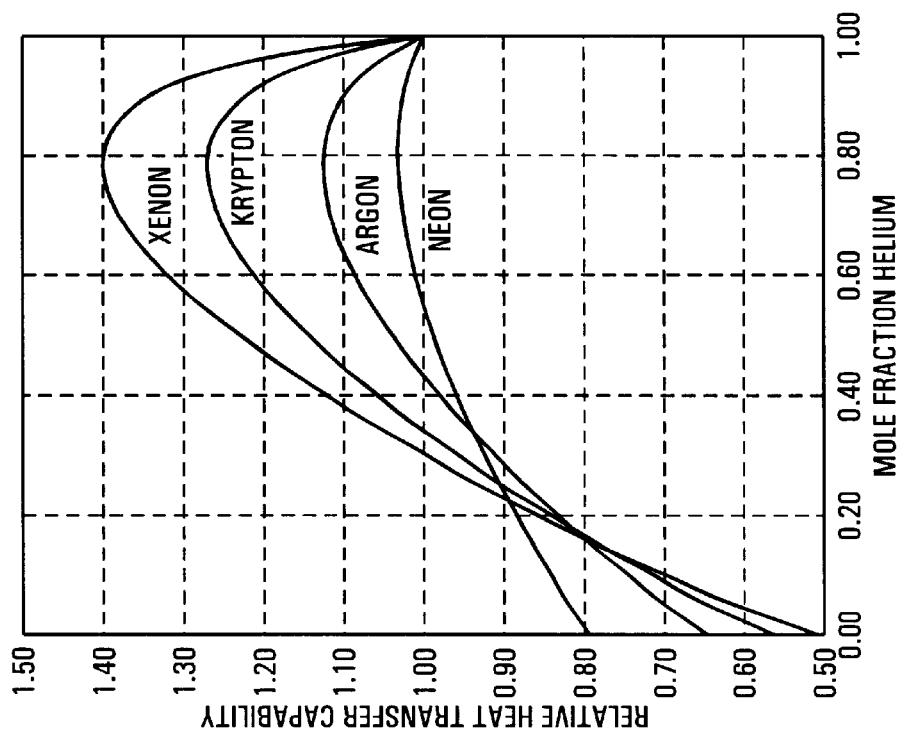

In general, the heat transfer fluid mixtures of the invention are beneficial in any system where a moving or non-moving item is intended to be cooled, either through direct contact with the heat transfer fluid, or indirect contact such as through a heat exchanger tube wall. In the optical fiber drawing art, the fiber typically moves through a heat exchanger and the gas mixture directly contacts the fiber (see for example FIG. 1 of U.S. Pat. No. 6,125,638, incorporated herein by reference for its teaching of an optical fiber cooling heat exchanger). While the heat transfer coefficient of a gas flowing across a stationary cylinder has been defined, for example as discussed in Holoboff et al. "Gas Quenching With Helium", *Advanced Materials & Processes,* February 1993, there are uncertainties involved in any particular heat transfer system that make prediction difficult. For example, in the fiber drawing art, the optical fiber is moving through a heat exchanger, being drawn by a spool. In one method, the coolant gas typically enters the exchanger at about the mid-point of the fiber in the exchanger, and then splits, some of the gas traveling co-currently with the fiber, and some traveling counter-currently in relation to fiber flow direction, as depicted in the 638 patent.

Figure 4:
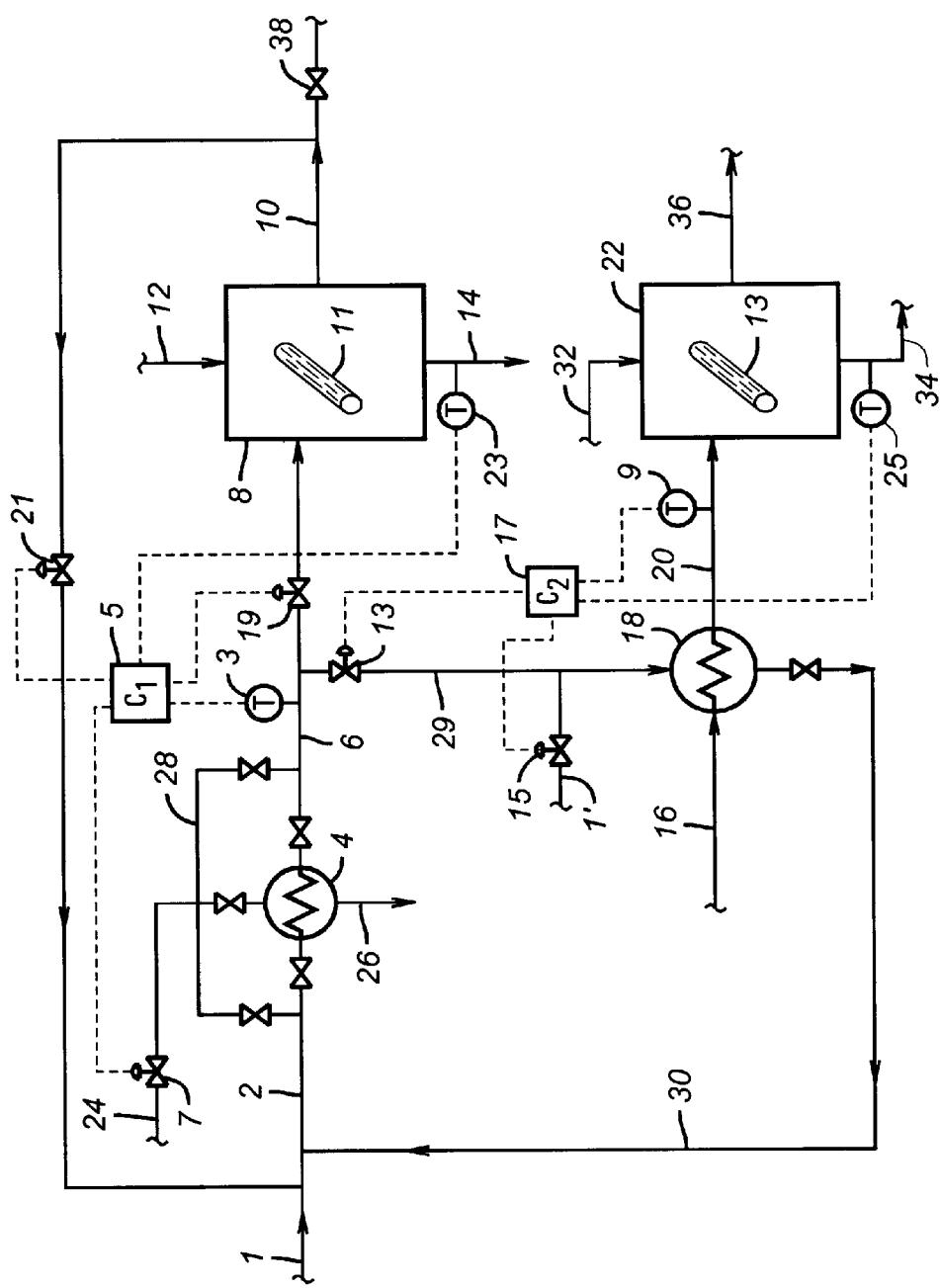
FIG. 4 illustrates schematically a preferred apparatus to carry out the methods within the first aspect of the invention for cooling a generic object.

FIG. 4 illustrates one preferred apparatus for carrying out the methods of the first aspect of the invention. A substantially pure, precooled heat transfer fluid is formed by flowing a substantially pure heat transfer fluid (helium, hydrogen, nitrogen, argon, nitrogen, or carbon dioxide) through a conduit 2, a heat exchanger 4, and conduit 6. The substantially pure, precooled heat transfer fluid is routed to a cooling unit 8, the latter having a heat transfer fluid exit conduit 10 attached thereto.

A primary feature of the present invention is provision for supply of a cooling medium, preferably having a very low temperature, preferably liquid nitrogen temperature or liquid oxygen temperature (referred to herein as a liquid cryogen), through a conduit 24 connected to heat exchanger 4. The liquid cryogen exits heat exchanger 4 through conduit 26. Cryogen in conduit 26, having been heated but still in liquid phase, or phase-changed or both, is preferably recycled back to conduit 24 for reuse. However, the cryogen could serve other purposes in the plant. For example, if the cryogen is ultra-high purity liquid nitrogen or argon, vaporized cryogen can be employed as purge gas, as discussed herein infra. Cryogen may also be used to directly contact heat transfer fluid flowing in conduit 6, if the cryogen is the same composition and of substantially the same or higher purity as the heat transfer fluid in conduit 6.

Cooling unit 8 is depicted generically as a box, with an object to be cooled, 11, illustrated in no particular position. Cooling unit 8 may be either a batch, continuous, or semi-continuous apparatus regarding the movement of the object or objects being cooled (movement of objects to be cooled is depicted by line 12, with line 14 indicating cooled objects). The heat transfer fluid may flow co-currently, countercurrently, cross-flow, or other flow pattern through the cooling unit in relation to the object being cooled, including a combination of these. Finally, the heat transfer fluid may either directly contact or indirectly contact object 11.

Alternatively, or concurrently, conduit 29 routes precooled, substantially pure heat transfer fluid to a second heat exchanger 18, where it exchanges heat with a second heat transfer fluid. Second heat transfer fluid enters heat exchanger 18 through conduit 16 and exits heat exchanger 18 through conduit 20. Substantially pure heat transfer fluid (no longer precooled) exits heat exchanger 18 through conduit 30 and is preferably recycled back to conduit 2. Similarly, substantially pure heat transfer fluid (no longer precooled) exits cooling unit 8 through conduit 10 is preferably recycled through control valve 21 back to conduit 2.

A purge conduit 38 is provided to allow purging of the heat transfer fluid and any impurities picked up, should there evolve any in the situation where cooling unit 8 allows direct contact of precooled, substantially pure heat transfer fluid with objects 11. Cooled second heat transfer fluid in conduit 20 is routed to a second cooling unit 22, which may be the same or completely different than cooling unit 8 in mechanical configuration, heat transfer fluid flow pattern, and the like. Objects to be cooled are illustrated as entering at 32 and exiting at 34. Second heat transfer fluid is illustrated as leaving cooling unit 22 through conduit 36 merely for simplicity. It is understood that some or this entire stream could be recycled back to conduit 16, or used in another process.

One advantage of the alternative of using some of the precooled, substantially pure heat transfer fluid to cool a second heat transfer fluid, is that the purity of the heat transfer fluid is substantially maintained. Another advantage is that two different materials could be cooled by the same system, for example in a metal parts heat treatment facility, using two different heat transfer fluid atmospheres directly contacting the two different metal substrates.

Illustrated in FIG. 4 is a conduit 1 which serves the function of introducing fresh heat transfer fluid. This conduit would traditionally be connected with a pressurized source of heat transfer fluid, such as a compressor, compressed gas cylinder, tube trailer, or air separation plant. Also illustrated is a conduit 1' which serves a similar function, only at an additional or alternative location. Conduit 1' preferably allows the addition of a second substantially pure heat transfer fluid which has been precooled using means not shown, should there be a failure in supply of the main heat transfer fluid in conduit 29. Conduit 15 may also allow, in other preferred embodiments, entry of a purge gas to purge the various conduits and equipment 4, 8, 18 and 22.

Operation of the system illustrated in FIG. 4 is preferably controlled using one or more control units. FIG. 4 illustrates two such units, C1 at reference numeral 5 and C2 at reference numeral 17. Control unit C1 preferably receives a signal representative of a temperature of the precooled, substantially pure heat transfer fluid flowing in conduit 6, from a temperature sensor 3. Control unit C1 also preferably receives a signal from a temperature sensor 23 representative of a temperature of the cooled object at 14 leaving cooling unit 8. Control unit C1 then preferably sends a signal to control valve 7 to control flow of cryogen, thereby indirectly controlling temperature of the precooled heat transfer fluid in conduit 6. Control unit C1 also preferably sends a signal to control valve 21 to control flow of heat transfer fluid recycle in conduit 10.

A second control unit C2 preferably receives a signal representative of a temperature of the second precooled, substantially pure heat transfer fluid flowing in conduit 20, from a temperature sensor 9. Control unit C2 also preferably receives a signal from a temperature sensor 25 representative of a temperature of the cooled object at 34 leaving cooling unit 22. Control unit C2 then preferably sends a signal to control valve 13 to control flow of precooled, substantially pure heat transfer fluid flowing in conduit 29, thereby indirectly controlling temperature of the precooled second heat transfer fluid in conduit 20. Control unit C2 also preferably sends a signal to control valve 15 to control flow of make-up heat transfer fluid in conduit 1'.

Control units C1 and C2 may, and preferably are themselves controlled by a supervisory control system (not shown), where the supervisory control system controls an entire industrial plant, such as a metal parts heat-treating facility, or a combined air separation/optical fiber cooling plant.

In one preferred method, precooled substantially pure heat transfer fluid flowing in conduit 6, and/or second heat transfer fluid flowing in conduit 20, are at least partially liquid (for example from about 10 to about 90 percent liquid), and are sprayed directly onto objects 11 and 12, respectively.

Figure 5:
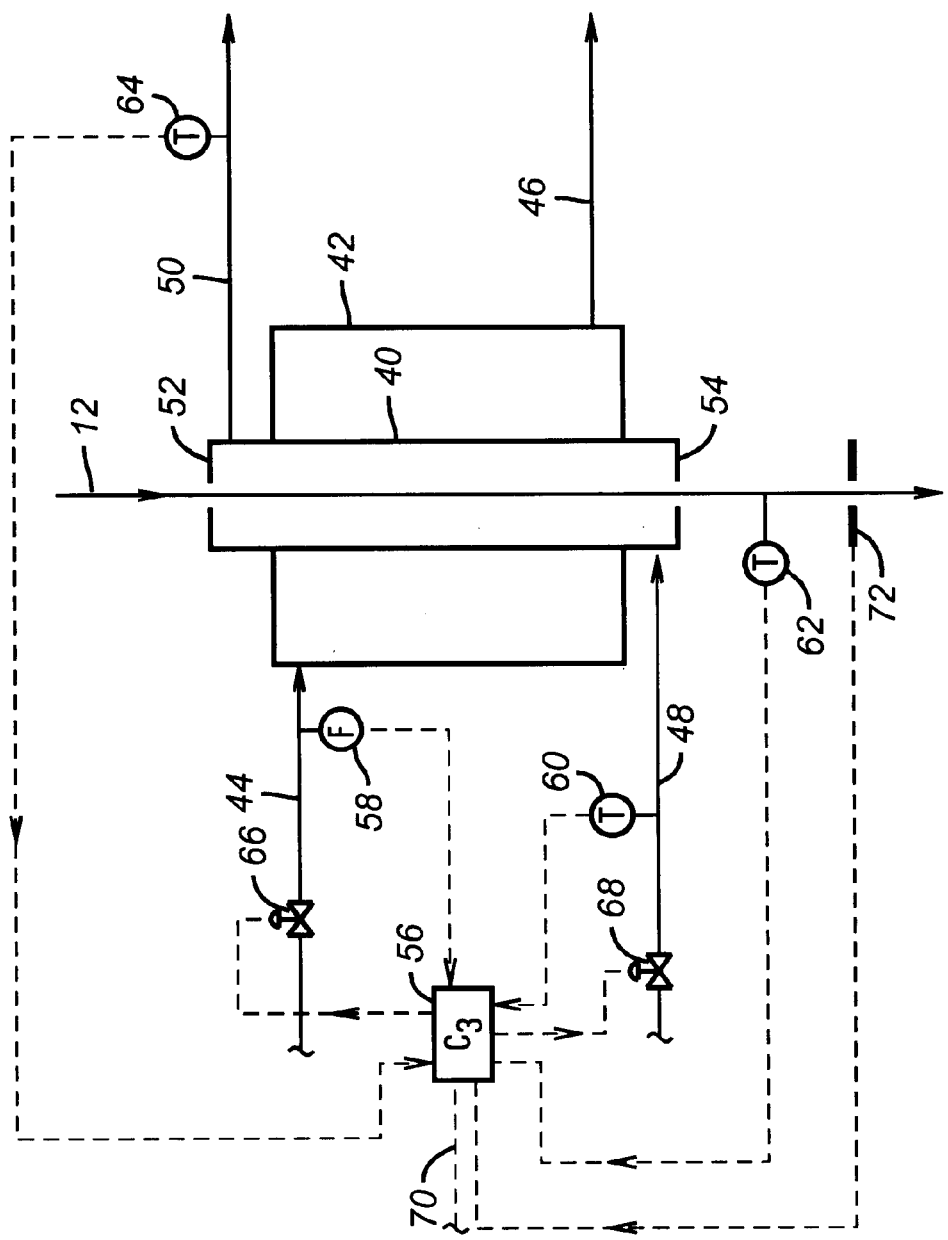
FIG. 5 illustrates schematically a preferred apparatus to carry out the methods within the second aspect of the invention for cooling a substantially cylindrical object such as an optical fiber.

Turning now to FIG. 5, this figure illustrates a specific apparatus employing another method embodiment of the invention for cooling an object 12, in this embodiment a substantially cylindrical object such as a wire or an optical fiber. Precooled, substantially pure heat transfer fluid flows in a conduit 48 and enters a substantially cylindrical tube 40 through which traverses the object 12. The heat transfer fluid directly contacts object 12 while passing, in this preferred embodiment, in counter-current fashion up tube 40 and passes out through conduit 50. The precooled, substantially pure heat transfer fluid also contacts an inner wall of tube 40, and further substantially retards, more preferably prevents, ingress of air through a tube inlet 52 and a tube outlet 54. A key aspect of this embodiment is the provision of a cryogenic liquid, as discussed in regard to FIG. 4, illustrated here as entering, through conduit 44, a chamber formed between an external wall of tube 40 and an internal wall of a second substantially cylindrical member 42. The cryogen contacts the external wall of tube 40 and conducts heat away from tube 40, and thus substantially maintains a temperature of the heat transfer fluid contacting the object.

A control unit C3 is preferably employed to control operation of this method and apparatus. Control unit C3 preferably receives a signal representative of a temperature of the precooled, substantially pure heat transfer fluid flowing in conduit 48, from a temperature sensor 60. Control unit C3 also preferably receives signals from a temperature sensor 62 representative of a temperature of the cooled object near tube outlet 54, a signal from a temperature sensor 64 representative of a temperature of the heat transfer fluid exiting tube 40, a signal from a diameter measuring device representative of a diameter of the object 12 near tube outlet 54, and a signal representative of flow of liquid cryogen flow in conduit 44. Control unit C3 then preferably sends a signal to control valve 68 to control flow of precooled, substantially pure heat transfer fluid flowing in conduit 48, and also preferably sends a signal to control valve 66 to control flow of liquid cryogen flowing in conduit 44. This control scheme may be modified to have, for example, a cascade control strategy, where the signal from the diameter measuring device 72 is routed to a master control unit (not shown), and temperature sensing and flow control loops are slaves to the diameter control loop. Further, as with the embodiment described in reference to FIG. 4, C3 may be supervised by a supervisory control device that controls an entire facility.

In one preferred method, precooled substantially pure heat transfer fluid flowing in conduit 48 is at least partially liquid (for example from about 10 to about 90 percent liquid), and is sprayed directly onto object 12.

The scope of the claims that follow is not intended to be limited by the description of preferred embodiments. Those skilled in the heat transfer art, after reading this disclosure, will recognize that the inventive compositions and methods are useful in a variety of heating and cooling applications.

What is claimed is:

1. A method of cooling an object, the method comprising:
a) cooling a heat transfer fluid with a liquid cryogen to form a precooled heat transfer fluid; and b) cooling the object with the precooled heat transfer fluid to form a cooled object and a recycle flow of said heat transfer fluid, the precooled heat transfer fluid consisting essentially of a compound selected from the group consisting of substantially pure hydrogen, substantially pure helium, substantially pure argon, substantially pure nitrogen, and substantially pure carbon dioxide, and wherein the step of cooling the object is selected from the group consisting of directly contacting the object with the precooled heat transfer fluid, indirectly contacting the object with the precooled heat transfer fluid in a heat exchanger, and combinations thereof.

2. The method of claim 1 wherein the step of cooling a heat transfer fluid with a liquid cryogen to form a precooled heat transfer fluid is selected from the group consisting of contacting the heat transfer fluid with the liquid cryogen, indirectly contacting the heat transfer fluid with the liquid cryogen in a heat exchanger, and combinations thereof.

3. The method of claim 1 wherein the precooled heat transfer fluid has a concentration of at least 99 mole percent.

4. The method of claim 1 wherein the precooled heat transfer fluid has a concentration of at least about 95 mole percent.

5. The method of claim 1 wherein the precooled heat transfer fluid has a concentration of at least about 90 mole percent.

6. The method of claim 1 wherein a temperature of the cooled object and a temperature of the precooled heat transfer fluid are monitored.

7. The method of claim 1 wherein said temperatures are used to control flow of said precooled heat transfer fluid, flow of said cryogen, and said recycle flow of heat transfer fluid.

8. The method of claim 7 wherein one or more of said flows are made automatically or manually based upon one or more of said temperatures.

9. The method of claim 1 wherein said object is substantially stationary and said precooled heat transfer fluid moves past said object.

10. The method of claim 1 wherein said object moves continuously through a space and said precooled heat transfer fluid moves through the space during said step of contacting said object with said precooled heat transfer fluid.

11. The method of claim 1 wherein said precooled heat transfer fluid exchanges heat with a second heat transfer fluid, and said second heat transfer fluid contacts said object.

12. The method of claim 11 wherein said object is a substantially cylindrical object traversing through a substantially confined space.

13. The method of claim 12 wherein said substantially cylindrical object is an optical fiber, and wherein said substantially confined space is a heat exchanger.

14. The method of claim 1 wherein said object is a substantially cylindrical object traversing through a substantially confined space.

15. The method of claim 14 wherein said substantially cylindrical object is an optical fiber, and wherein said substantially confined space is a heat exchanger.

16. The method of claim 1 wherein the step of contacting the precooled heat transfer fluid with the object comprises spraying the precooled heat transfer fluid onto said object.

17. The method of claim 1 wherein the heat transfer fluid is essentially all gaseous.

18. The method of claim 17 wherein step b) comprises monitoring the temperature of the heat transfer fluid and a temperature the exit flow of said heat transfer fluid.

19. The method of claim 17 wherein a temperature of the cooled substantially cylindrical object is monitored.

20. The method of claim 17 wherein a diameter of the cooled substantially cylindrical object is monitored.

21. The method of claim 17 wherein a flow of said cryogen and a flow of said heat transfer fluid are controlled.

22. The method of claim 17 comprising monitoring the temperature of the heat transfer fluid and a temperature the exit flow of said heat transfer fluid; monitoring a flow of said cryogen; monitoring a temperature of the cooled substantially cylindrical object; monitoring a diameter of the cooled substantially cylindrical object; and wherein a flow of said cryogen and a flow of said heat transfer fluid are controlled.

23. The method of claim 17 wherein the heat transfer fluid is essentially all gaseous.

24. The method of claim 17 the heat transfer fluid is essentially all liquid.

25. The method of claim 17 the heat transfer fluid comprises gas and liquid.

26. The method of claim 1 wherein the heat transfer fluid is essentially all liquid.

27. The method of claim 26 wherein step b) comprises monitoring a flow of said cryogen.

28. The method of claim 1 wherein the heat transfer fluid comprises gas and liquid.

29. The method of claim 1, wherein the precooled heat transfer fluid is one of a liquid, a gas, and a mixture of a liquid and a gas.

30. The method of claim 1, wherein the step of cooling the heat transfer fluid is selected from the group consisting of directly contacting the heat transfer fluid with the cryogen and indirectly contacting the heat transfer fluid with the cryogen in a heat exchanger.

31. A method of cooling a substantially cylindrical object traversing a substantially confined space, the method comprising: a) directly contacting a heat transfer fluid with said substantially cylindrical object inside of the confined space, the confined space defined by a substantially cylindrical tube having a tube inlet and a tube outlet, the substantially cylindrical object entering the tube inlet and exiting the tube outlet, the substantially cylindrical tube having a heat transfer fluid inlet near the tube outlet and a heat transfer fluid outlet near the tube inlet; and b) substantially maintaining a temperature of the heat transfer fluid contacting the substantially cylindrical object by cooling the heat transfer fluid with a cryogen to form a cooled substantially cylindrical object and an exit flow of said heat transfer fluid, the heat transfer fluid consisting essentially of a compound selected from the group consisting of substantially pure hydrogen, substantially pure helium, substantially pure argon, substantially pure nitrogen, and substantially pure carbon dioxide.

32. The method of claim 20, wherein the precooled heat transfer fluid is one of a liquid, a gas, and a mixture of a liquid and a gas.

33. The method of claim 20, wherein the step of cooling a heat transfer fluid with a liquid cryogen to form a precooled heat transfer fluid is selected from the group consisting of contacting the heat transfer fluid with the liquid cryogen and indirectly contacting the heat transfer fluid with the liquid cryogen in a heat exchanger.

* * * * *